United States Patent [19]

Cretella et al.

[11] 4,155,152

[45] May 22, 1979

[54] METHOD OF RESTORING THE SHROUDS OF TURBINE BLADES

[76] Inventors: Salvatore J. Cretella, 180 Fitch St., North Haven, Conn. 06473; Matthew Bernardo, 62 Lee St., West Haven, Conn. 06516; Ralph T. DeMusis, 547 Foxon Rd., North Branford, Conn. 06471

[21] Appl. No.: 859,438

[22] Filed: Dec. 12, 1977

[51] Int. Cl.$^2$ .......................... B23P 15/02; B23P 7/00
[52] U.S. Cl. ........................... 29/156.8 B; 29/401 A; 29/527.4; 427/34
[58] Field of Search .......... 29/156.8 B, 401 A, 401 E, 29/401 R, 527.4, 527.2; 427/34, 282, 376 C, 376 B, 376 H, 376 G; 51/217 R

[56] References Cited

U.S. PATENT DOCUMENTS

| | | | |
|---|---|---|---|
| 3,004,336 | 10/1961 | Timuska | 29/401 |
| 3,436,512 | 4/1969 | Cape | 427/34 |
| 3,606,665 | 9/1971 | Glucoft | 29/401 |
| 3,607,381 | 9/1971 | Fairbairn | 427/34 |
| 3,642,519 | 2/1972 | Tiner et al. | 427/34 |
| 3,711,310 | 1/1973 | Lepper, Jr. | 427/34 |
| 3,814,447 | 6/1974 | Prasse et al. | 427/34 |
| 3,981,688 | 9/1976 | Telang et al. | 427/34 |
| 4,028,787 | 6/1977 | Cretella et al. | 29/156.8 B |

*Primary Examiner*—C. W. Lanham
*Assistant Examiner*—Daniel C. Crane
*Attorney, Agent, or Firm*—H. Gibner Lehmann; K. Gibner Lehmann

[57] ABSTRACT

A method of restoring the shroud of a turbine blade which has become worn, and particularly that edge of the shroud in the vicinity of what is commonly known as the Z-notch, which comprises the steps of grinding down the shroud in the vicinity of said notch to an accurately predetermined dimension with respect to the original geometry of the shroud, placing the blade in a fixture having a masking member with a slot in it, such that the Z-notch of the blade is disposed substantially in alignment with the slot, and depositing, by means of a plasma spray, a metal alloy onto the edge in an amount just sufficient to build up the same essentially to its original dimension. Following the plasma spraying, the built-up edge is sintered at a temperature on the order of 1900° F. or more, to more firmly bond the built-up layer to the base metal. The blade is then cooled. The resulting edge conforms so closely to the original geometry of a new blade that no additional refinishing or grinding operations are normally required after the sintering.

14 Claims, 22 Drawing Figures

METHOD OF RESTORING THE SHROUDS OF TURBINE BLADES

CROSS REFERENCE TO RELATED APPLICATIONS

1. Copending application of Ralph T. DeMusis, Salvatore J. Cretella and Matthew Bernardo, U.S. Ser. No. 777,674 filed Mar. 15, 1977, now U.S. Pat. No. 4,128,929, and entitled METHOD OF RESTORING WORN TURBINE COMPONENTS AND CLAMPING FIXTURES ASSOCIATED THEREWITH.

BACKGROUND

This invention relates generally to methods of repairing and restoring turbine components such as vanes or blades, and more particularly to procedures which involve the restoration of the shroud portion of blades that have become damaged or worn.

Turbines blades are normally carried in the engine by a central hub, and are disposed essentially radially with respect to the axis thereof. The ribbed mounting base portions of the blades are received in corresponding slots in the hub, with the blade shrouds nesting against one another and being held in assembled relation by a suitable ring. During the operation of the engine there is a minute but continuous vibration of adjacent blades with respect to one another and with respect to the hub. This vibration gives rise to wear at the opposite edges of the shroud, in the vicinity of what is known as the Z-notches of the shroud, making necessary a replacement of the blades in the turbine after a certain period of operation has elapsed.

In the past, the repair of blades has been undertaken by applying beads of welding material to those areas of a blade which have worn away. The material was generally applied with welding rod having substantially the same composition as that of the base metal of which the blade was constituted. The welded areas were built-up to a dimension exceeding that of the original part, and thereafter the excess removed by grinding, to thereby restore the part to its original geometry. Such procedures have already been used extensively in the restoration of blades, and have met with a high degree of success.

However, as outlined above the prior procedures have several disadvantages. The welding rod employed tended to be expensive, running in excess of $100 per pound at current prices. In addition, since the welding had to be accomplished by hand, there were additional costs involved with labor. Moreover, because the blades were to be exposed to high temperatures and stresses in use, there was required a number of inspections during the processing in order to be sure that the welds were adequate, and to be sure that a satisfactory bond was obtained. Following this, the part was of necessity ground down to restore it to the dimensions of a new part. After the grinding, there usually were additional inspection steps that were required.

The costs involved with the above procedures were substantial, although they were generally less than those resulting from merely discarding old or worn blades and replacing them with brand new units.

SUMMARY

The above disadvantages and drawbacks of prior refinishing procedures are obviated by the present invention, which has for an object the provision of a novel and improved method for restoring the edges of a turbine blade shroud in the vicinity of the Z-notches thereof, which is especially simple to carry out and at the same time provides a finished product that meets the stringent requirements set forth for tubine vane or blade and like components.

A related object of the invention is the provision of an improved method as above, which involves a minimum of hand labor, thereby resulting in reduced cost and a reduction in operator-related errors.

Still another object of the invention is the provision of an improved method as above, wherein little or no grinding or refinishing of the built-up part is required following application of the metal overlay thereto, with the end result that the time required for refurbishment is reduced, and the cost involved with the restoration or repair of the blade is brought to a lower figure than was previously possible.

The above objects are accomplished by a novel method for restoring or repairing worn turbine blades of the type having an alloy composition which contains a preponderance of either cobalt or nickel, the method comprising the steps of grinding down to an accurately predetermined measurement, one edge of one of the Z-notches in the mounting shroud at one end of the blade, placing the blade in a fixture having a masking member with a slot in it, such that the Z-notch of the blade is disposed substantially in alignment with the slot, and depositing on the ground-down, undersize edge by means of a plasma stream, a quantity of a metal alloy having a preponderance of either cobalt or nickel just sufficient to build up the edge to its original dimension. Thereafter the blade is sintered at elevated temperatures for a predetermined length of time, in order to season the repair and improve the bond.

Following the sintering, the blade is cooled. Additional refinishing in the form of grinding the plasma sprayed edge is not required. Furthermore, the edge which is built-up in accordance with the invention as above set forth possesses the high-temperature resistance and stress resistance of new components, and can thus meet the stringent requirements of use specified for such parts. Since little manual labor is involved, the overall cost of repair is reduced, and the chance that operator-related error will be introduced into the refinished product is minimized.

In carrying out the above process, it has been found that the precise, proper amount of metal can be accurately deposited on the shroud edge, with no successive grinding or refinishing operations being required. Thus, there is no excess of material which is applied to the shroud and there are no additional steps involved in the processing of the blade, other than sintering the same and thereafter cooling it.

This procedure constitutes a distinct improvement over the older method, where welding rod was used to build up the edge to a dimension in excess of that of a new blade, and thereafter the excess removed by grinding. In such a case, the ground-off material usually could not be salvaged. With the high cost of the original welding rod as noted above, as well as the high cost of labor, the older methods of repair thus proved to be quite expensive to carry out.

Other features and advantages will hereinafter appear.

In the drawings, illustrating various steps in the method of the invention and particularly showing several fixtures involved with carrying out the method.

Figures 1, 2, 3, 4:
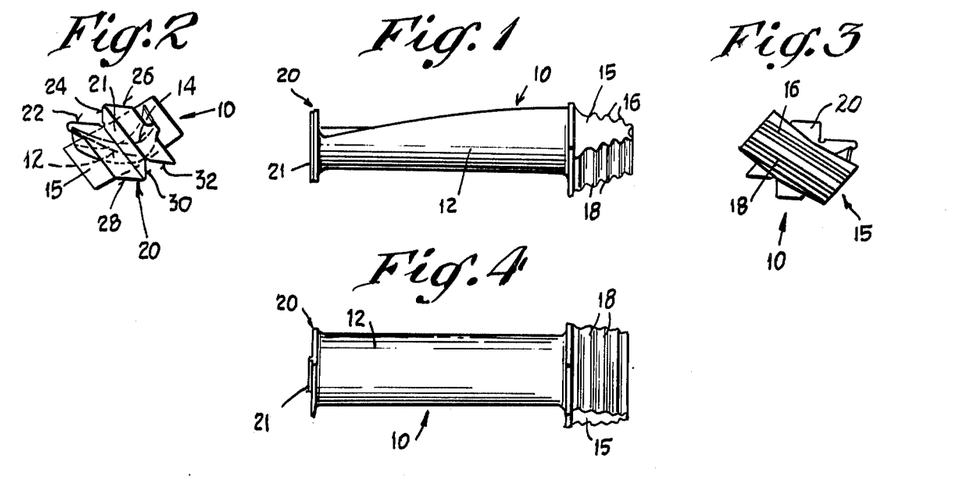
FIG. 1 is a front elevational view of a turbine blade of the type adapted to be refinished according to the method of the present invention.
FIG. 2 is a left end elevation of the blade of FIG. 1.
FIG. 3 is a right end elevation of the blade of FIG. 1.
FIG. 4 is a bottom plan view of the blade of FIG. 1.

FIGS. 1–4 illustrate a turbine blade of the type adapted to be refurbished according to the methods of the present invention. The blade is generally designated by the numeral 10, and includes a convex airfoil surface 12, and a concave airfoil surface 14 (FIG. 2). As the blade is traversed lengthwise, the shape of the airfoil section changes, this giving rise to the double airfoil (dotted) outline shown in FIG. 2. The blade further comprises a mounting base portion 15 which is tapered as shown in FIG. 1, with a series of ribs 16 on one side, and a second series of ribs 18 on the other side. At the opposite end of the blade is a shroud of irregular outline, particularly shown in FIG. 2. The shroud is indicated by the numeral 20, and comprises edge portions 22, 24, 26 and 28, 30, 32.

Figure 5:
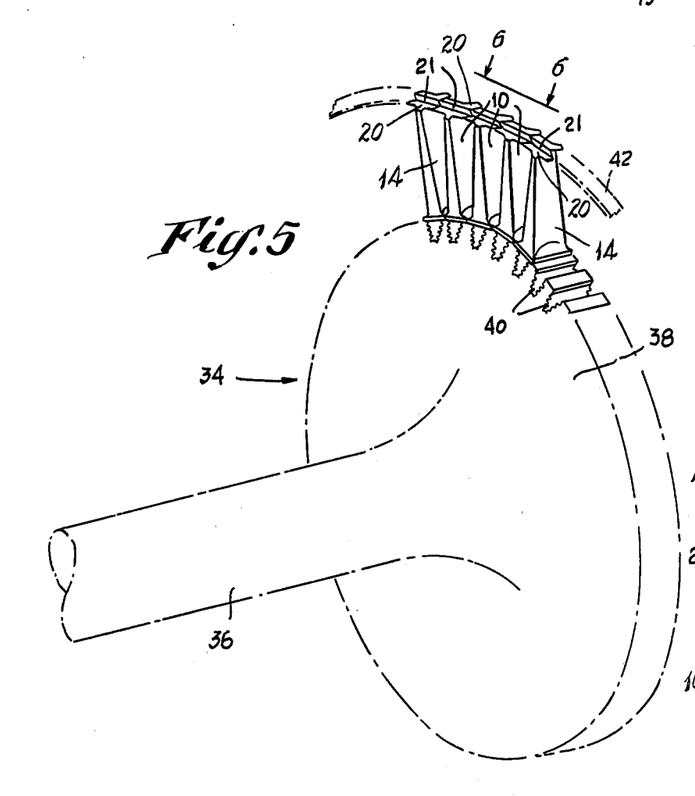
FIG. 5 is a perspective view of a turbine rotor incorporating a series of blades of the type shown in FIGS. 1–5.
Figure 6:
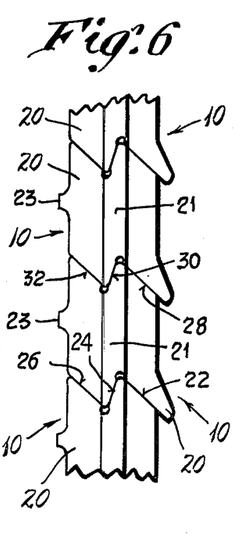
FIG. 6 is a fragmentary view taken on the line 6—6 of FIG. 5.

FIG. 5 illustrates a turbine rotor 34 in dotted outline, including a shaft 36 and a rotor hub 38, the latter having a series of radially extending recesses 40 in its periphery, the recesses being adapted to receive the ribbed base portions 15 of the turbine blades 10. A series of such blades 10 is illustrated in FIG. 5, occupying the positions they would appear in during normal operation of the turbine. As illustrated in FIG. 6, the shrouds 20 of the blades are seen to nest with one another, and ribs 21 on each shroud align with one another. A suitable sealing ring 42 extends around and engages the nested shrouds, thereby holding captive the blades 10 in their operative positions. The ring 42 is illustrated in dotted outline in FIG. 5.

During the operation of the turbine, there occurs considerable vibration of the rotor hub 38, which gives rise to slight relative movements of the individual blades 10 with respect to one another and with respect to the rotor hub itself. With the nesting engagement of the shrouds 20 as in FIG. 6, the edge portions 22–26 and 28–32 of adjacent units rub against one another continuously, causing them to become worn away after a prolonged period of use. Repair of certain ones of these edges can be effected by a method disclosed in applicants' copending application identified above, U.S. Ser. No. 777,674. The repair or restoration of two of the remaining edge portions, namely those indicated by the numerals 24 and 30, will be described below.

In accordance with the present invention there is provided a novel and improved method for refurbishing the worn shrouds of turbine blades and the like which have become worn or damaged over prolonged periods of use, the method involving the steps of removing a carefully controlled amount of a worn edge so as to bring it to a certain predetermined dimension with respect to the remainder of the blade, and thereafter plasma spraying a precisely controlled layer on the ground down edge so as to restore the edge to its original geometry. In particular, the method of the invention provides for the repair and restoration of the edges of the shroud known in the trade as the "Z-notches", which refer particularly to the edge portions designated 24 and 30 in FIG. 6.

In carrying out the method, the worn blades are clamped or otherwise mounted in three fixtures in succession, the fixtures being illustrated particularly in FIGS. 7-9, FIGS. 10-14, and FIGS. 15-19 respectively.

Figure 7:
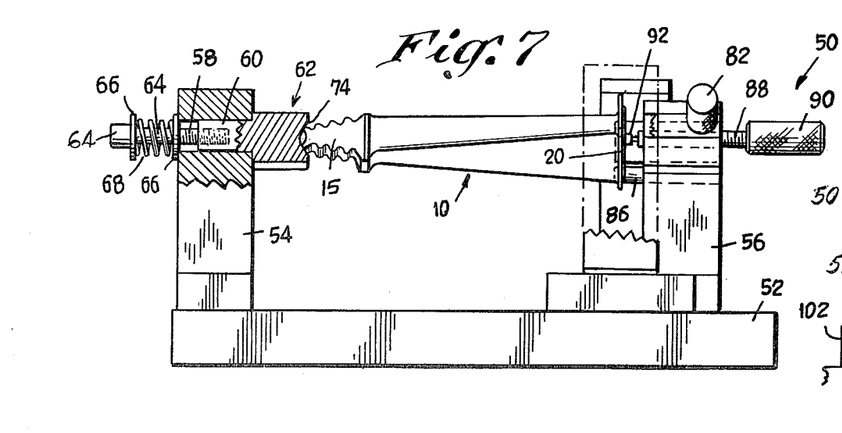
FIG. 7 is a front elevational view of a first fixture adapted for use with a surface grinder apparatus, wherein a worn blade of the type adapted to be refurbished according to the method of the present invention, is shown clamped in a position presenting one Z-notch of the shroud in an upwardly facing direction, such that carefully controlled amounts of the worn edge can be removed.
Figure 8:
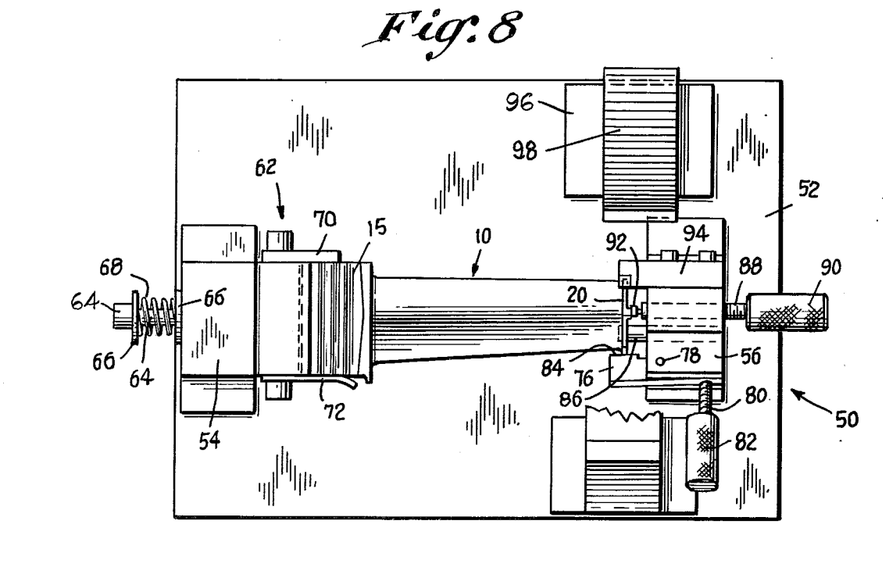
FIG. 8 is a top plan view of the fixture of FIG. 7.
Figure 9:
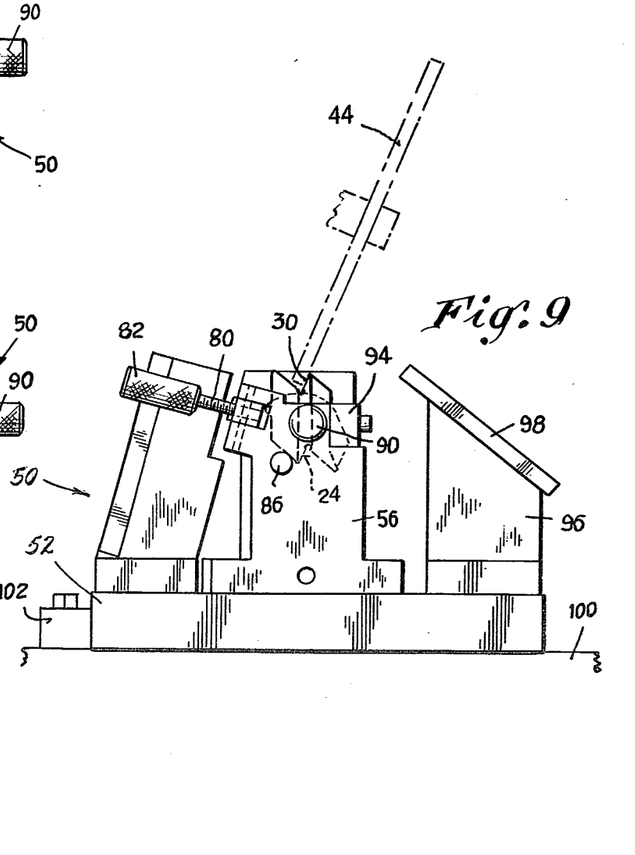
FIG. 9 is a right end elevational view of the fixture of FIG. 7.

Referring to FIGS. 7-9, there is shown the first of the three fixtures, which enables a blade to be clamped in a position with its concave airfoil surface facing downwardly, and where the edge 30 of the shroud of the blade faces upwardly, for engagement by a suitable grinding wheel 44 (FIG. 9). The fixture is generally designated by the numeral 50, and comprises a base having a slide plate 52 with an upstanding end block 54 at one end, and a second upstanding end block 56 at its other end. The first end block 54 has a transverse hole 58 in which there is received the boss 60 of a base carrier block or swivel cradle 62. The boss 60 includes a threaded hole which receives a cap screw 64, carrying washers 66 which are maintained spaced apart by means of a spring 68. This mounting arrangement for the carrier block 62 enables it to turn or swivel within limits. It is adapted to receive the base 15 of a turbine blade in the manner of FIG. 7. In addition, a stationary guide arm or flange 70 is carried on the block 62, and a resilient arm or flange 72 is disposed at the opposite end of the block 62, for holding the base 15 captive. The face of the block 62 includes a hollow recess 74 to thereby provide a seat for the end of the base 15.

The second upstanding block 56 of the base carries a clamp comprising a jaw 76 which can swivel about a pin 78 in the block 56. Carried by the jaw 76 is an actuator screw 80 having a knurled knob portion 82. The screw 80 is received in a threaded hole in the jaw 76. The jaw 76 includes a facing 84 which bears against a protrusion 23 (FIG. 6) of the shroud 20.

Also carried by the block 56 is a hardened steel pin 86 constituting a supporting surface for the edge 26 of the shroud when the blade is clamped in position as shown. A second screw 88, constituting a clamping screw and having a knurled knob 90, is carried in the block 56 of the base. It carries a hardened steel end piece 92 which bears against the rib 21 of the shroud (FIG. 6) when the screw 88 is tightened.

In FIGS. 8 and 9 a supplementary support surface is provided in the form of a block 94 constituting a shoulder against which an edge of the blade shroud can rest.

Also carried by the base are upstanding blocks 96, 98. These blocks 96, 98 are associated with refurbishment of other parts of the shroud of the blade, and accordingly form no part of the present invention. Further discussion of these structures is accordingly omitted.

The surface grinder includes a table 100, as shown in FIG. 9, and a guide 102 against which the slide plate 52 can move as a grinding operation on the edge 30 is being made.

The blade to be refurbished is installed in the fixture 50, and a carefully controlled amount of the edge 30 is ground off by the wheel 44, as the fixture 50 is slid along the guide 102. The exact amount to be removed is determined in part by the severity of the wear which has occurred. It will be understood that the relative positions of the guide 102 and grinding wheel 44 with respect to the table 100 are determined experimentally. Following the grinding operation outlined above, the edge 30 will have a fixed dimensional relationship with respect to the remainder of the shroud 20 and blade 10.

Figures 13, 14:
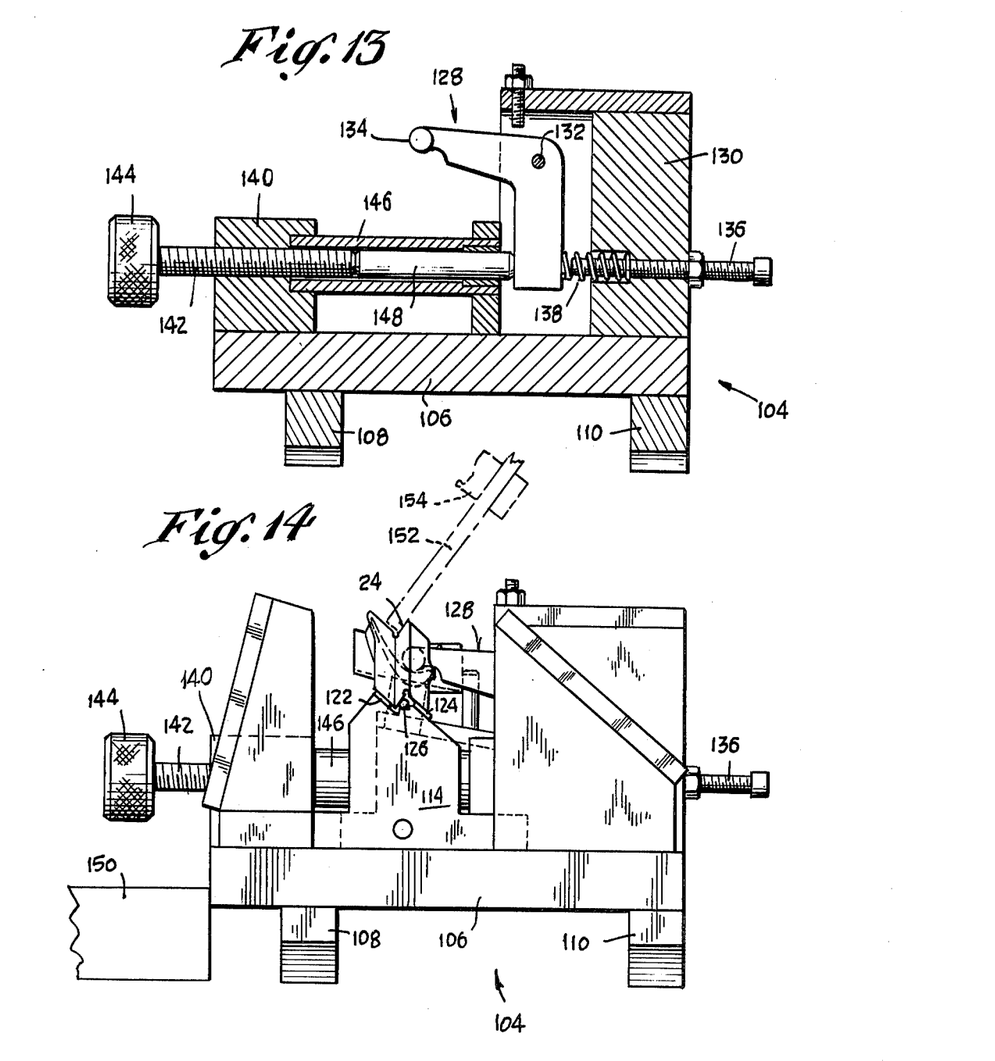
FIG. 13 is a section taken on line 13—13 of FIG. 10.
FIG. 14 is a side elevational view of the fixture of FIG. 10.

The blade is then removed from the fixture 50 shown in FIGS. 7-9, and transferred to a second fixture particularly illustrated in FIGS. 10-14. This fixture is adapted to clamp the blade in a position with its concave airfoil surface facing upwardly, such that the opposite edge 24 of the shroud 20 can be engaged by a suitable grinding wheel, as shown in FIG. 14.

Figure 10:
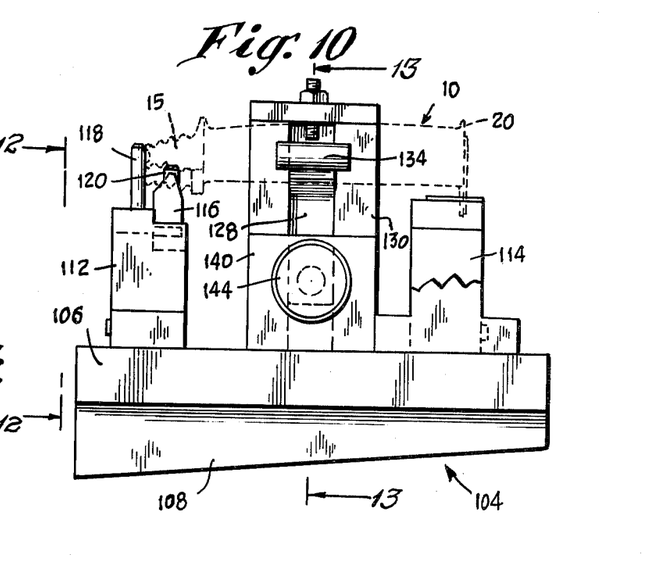
FIG. 10 is a front elevational view of a second fixture adapted for use with a surface grinder apparatus, wherein the worn blade is shown clamped in a position presenting the other Z-notch of the shroud in an upwardly facing direction, such that carefully controlled amounts of the worn edge can be removed.
Figure 11:
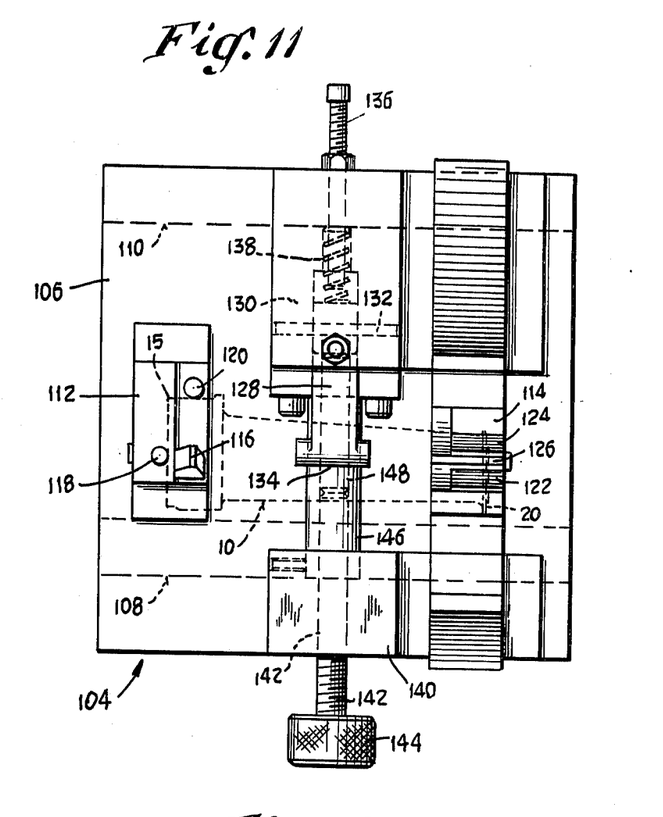
FIG. 11 is a top plan view of the fixture of FIG. 10.
Figure 12:
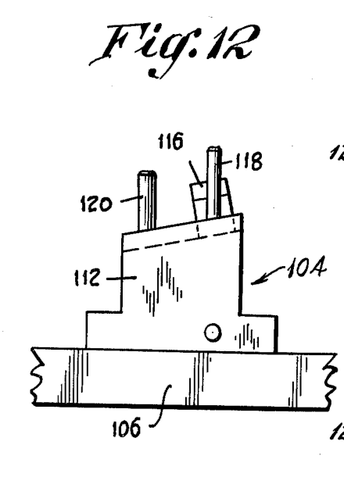
FIG. 12 is a fragmentary view taken on line 12—12 of FIG. 10.

This second fixture is generally designated by the numeral 104, and comprises a base plate 106 and a pair of slides or runners 108, 110. As illustrated in FIG. 10, the base 106 includes an upstanding support block 112 adapted to position the base 15 of the turbine blade being refinished, and a second upstanding block 114 engageable with the shroud of the turbine blade. In accomplishing proper positioning of the base 15, the block 112 carries a hardened steel support member 116 and a pair of upstanding positioning pins 118, 120. The support member 116 is adapted to engage one of the ribbed portions of the base 15, in the manner of FIG. 10, when the blade 10 is clamped in position as shown. Referring to FIG. 14, the block 114 carries two hardened steel facings 122, 124 which are adapted to engage the edges 28 and 32, respectively of the shroud. In addition, a hardened steel pin 126 is provided, engageable with the edge 30 of the shroud of the blade, when the latter is clamped in position.

As particulary illustrated in FIG. 13, there is provided a clamping arm 128 which is pivotally carried on an upstanding carrier block 130 by means of a pin 132. The clamp has a facing 134 of generally cylindrical configuration, which is receivable in the concave air foil portion of the turbine blade in the manner of FIG. 14. Carried in the block 130 is a screw 136 constituting a guide for a spring 138 which bears against an end portion of the clamp 128. An additional block 140 is also carried on the base 106, and a screw 142 having a manually engageable knob 144 extends into a tubular guide sleeve 146, for engagement with an actuator pin 148. One end of the latter bears against an end portion of the clamp 128, for effecting pivotal movement thereof. As can be readily understood, as the screw 142 is advanced, the clamp 128 undergoes counterclockwise movement about the pivot pin 132, thus bringing the facing 134 into engagement with the concave air foil surface. Such clamping engagement is illustrated in FIG. 14.

With the fixture illustrated in FIGS. 10-14, it is noted that the precise positioning of the turbine blade is determined almost entirely by the engagement by the edge of the shroud 20 with the corresponding facings 122, 124 and pin 126. The support member 116 and position pins 118, 120 merely provide a backing for the base portion 15 of the turbine blade as the facing 134 is brought into engagement with the blade air foil surface.

FIG. 14 illustrates a guide 150 against which the base 106 of the fixture can slidably move during the grinding operation to be described below. Also illustrated in FIG. 14 is a grinding wheel generally designated by the numeral 152, turnably carried by a power-driven shaft 154.

The turbine blade to be refurbished is first ground down in the fixture of FIGS. 7-9 and then transferred to the fixture shown in FIGS. 10-14, wherein the face 24 is presented for engagement with the grinding wheel 152. As the fixture is slidably moved along the guide 150, a carefully controlled amount of the edge 24 is removed. The absolute amount of material to removed is determined experimentally, and in part depends upon the severity of wear which has occurred in the batch of blades which are being repaired. Following the completion of this grinding step, the edge 24 will bear a fixed dimensional relationship with respect to the remainder of the shroud 20 of the blade, and with respect to the remainder of the blade's air foil surface and base.

Figures 15, 18:
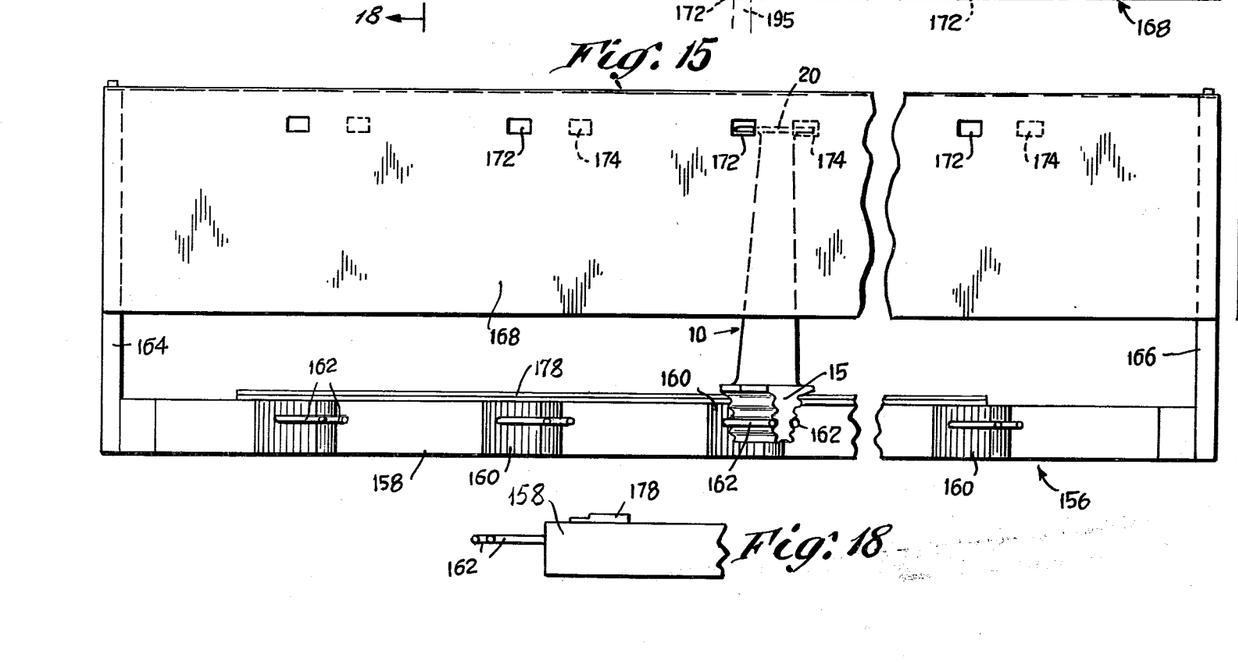
FIG. 15 is a front elevational view of a third fixture, having a masking member with multiple slots in it, the fixture being adapted to mount a plurality of blades with the oppositely facing Z-notches of their shrouds being aligned respectively with the slots in the member, such that overlay metal can be plasma sprayed through the slots and onto the surfaces of the notches, so as to build up the same.
FIG. 18 is a fragmentary section taken on line 18—18 of FIG. 16.
Figure 19:
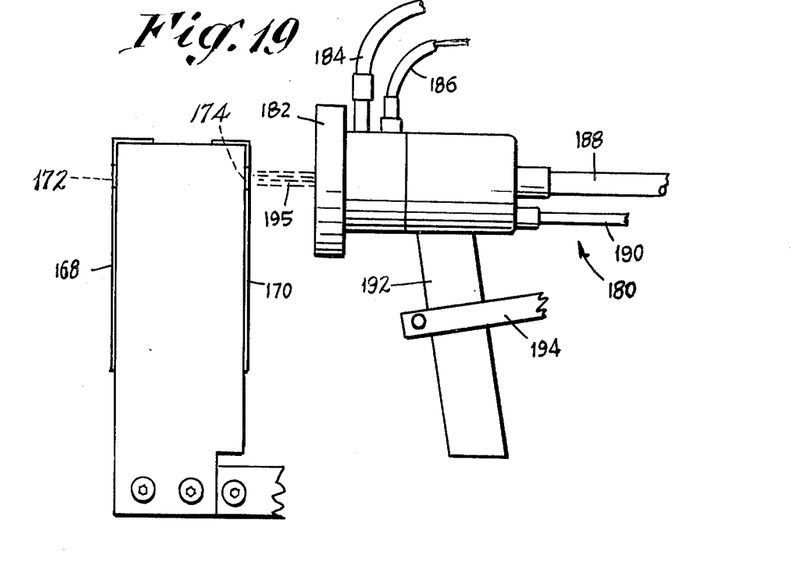
FIG. 19 is a fragmentary side elevational view of the fixture of FIG. 15, and also showing a plasma spray gun apparatus employed in the method of the present invention.
Figure 20:
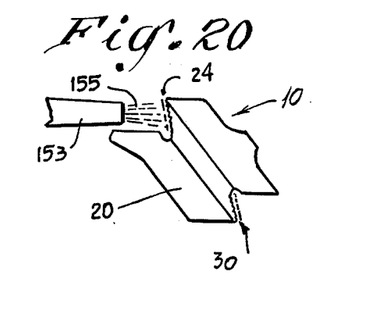
FIG. 20 is a view like FIG. 2, except showing the blade after the Z-notch of its shroud has been ground down, and wherein a sand blast is applied to the ground portions so as to remove any burrs therefrom.

The blade is removed, and can optionally be subjected to a de-burring operation in the form of a sandblast, with 0.005"-0.010" particle size, as shown in FIG. 20. The nozzle of the sand blaster is designated by the numeral 153, and the sand blast stream is indicated at 155. FIG. 20 also shows, in dotted outline, the locations of the original edges of the Z-notches, with the locations of the ground down edges being illustrated in solid lines, and having minute burrs which resulted from the grinding operation, and which are removed by the sand blast. Following de-burring, the blades are placed in a third fixture particularly illustrated in FIGS. 15-19. The fixture is generally designated by the numeral 156 and comprises an elongate, generally rectangular base 158, having a series of spaced notches 160. Extending from each notch 160 is a pair of spaced-apart support rods 162, adapted to engage the opposite surfaces of the ribbed portion 15 of the turbine blade, as illustrated in FIG. 15. Disposed at the end of the base 158 is a pair of upstanding supports 164, 166 which carry two co-extensive mask members 168, 170. A series of slots 172 is provided in the member 168 with a similar series of slots 174 being provided in the member 170. The arrangement is such that when a turbine blade is supported on the base 158 in the manner illustrated in FIG. 15, the adjacent slot 172 is disposed substantially in alignment with the edge 30 of the shroud, and the adjacent slot 174 is likewise disposed substantially in alignment with the edge 24 of the shroud.

Figure 16:
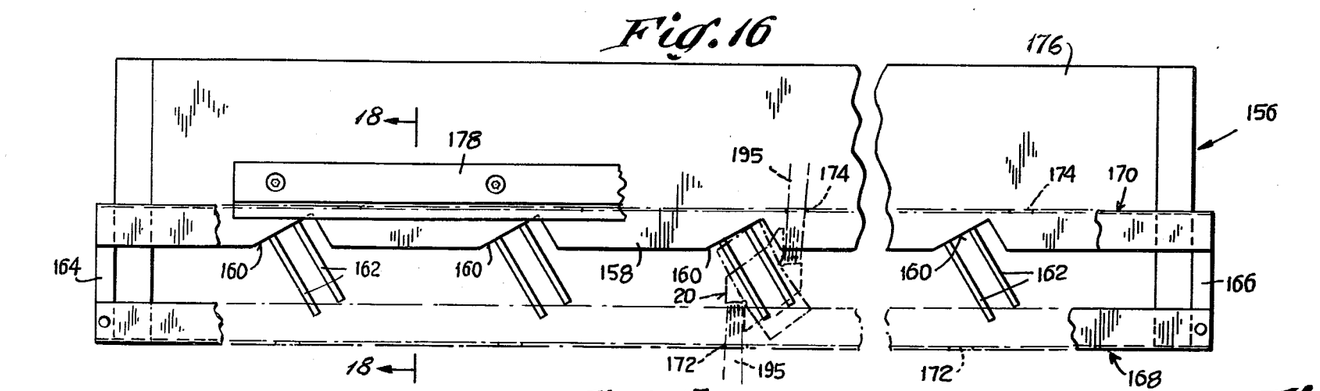
FIG. 16 is a top plan view of the fixture of FIG. 15.
Figure 17:
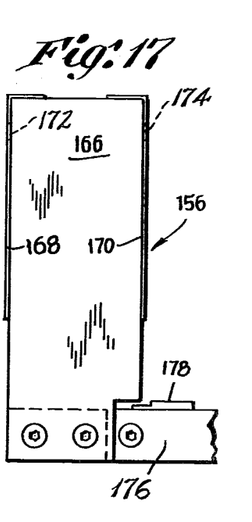
FIG. 17 is a fragmentary right end elevation of the fixture of FIG. 15.

As particularly illustrated in FIG. 17, the base has a rearwardly extending portion 176 which is secured to a suitable support (not shown), for mounting the fixture in a desired, predetermined position. In addition, an elongate abutment strip 178 is provided as shown in FIGS. 16 and 18, against which the base portion 15 of the turbine blades can bear when a series of such blades is installed on the fixture. The abutment strip 178 serves to maintain the blades substantially in alignment with one another during the plasma spray process to be described below.

Referring now to FIG. 19 and in accordance with the present invention, there is provided a novel and improved method for effecting a precision build-up of the ground-down edges 24, 30 of the turbine blade, such that the edges so built up closely resemble the physical dimensions and metallurgical characteristics of a substantially new blade. In accomplishing this there is, as illustrated, a plasma spray gun generally designated by the numeral 180, having a nozzle 182 and also having a series of hoses 184-190 extending thereto, for carrying metal alloy powder to the gun, together with oxygen, argon, and water. The plasma spray gun can be similar to that made by Plasma Dyne Corporation, and designated by the model number Mach II. This spray gun is especially adapted for despositing molten metal on a base part, wherein the velocity of the stream emanating from the nozzle is in excess of the speed of sound. The gun 180 has a handle 192, and a bracket 194 extends to a suitable support (not shown) for properly positioning the nozzle 182 of the gun with respect to the slots 172 or 174, one at a time.

By the present invention, a stream of molten metal alloy is desposited in succession on the edges 24, 30 of the shroud 20, in order to build up the edge just a sufficient amount so that it closely resembles its original geometry. The diameter of the stream in the vicinity of the slot 172 or 174 is quite small, being on the order of 1/16th of an inch. In addition, due to the characteristics of the nozzle, the stream emanates in a swirling pattern. The present apparatus has been found to be extremely effective in depositing a dense, highly uniform layer of material onto the ground down edge, such that the finished product closely resembles the dimensions and physical characteristics of a new part. As can be readily understood, with a series of blades positioned side by side in the fixture 156, the gun is moved from one slot 172 to the next, and the procedure continued, until all the blades have had their corresponding edges 30 built up. In a similar manner, the gun is then moved to the other side of the fixture and aligned with the slots 174, one at a time. Molten metal is then plasma sprayed onto the oppositely facing edge portions 24. In FIGS. 16 and 19, the plasma stream is designated by the numeral 195. It can be readily understood that the slots 172, 174 limit the width of the stream 195 where it strikes the edges 24 or 30 of the shroud, since part of the stream near its periphery is intercepted by the walls of the mask member 168, 170 in the immediate vicinity of the slots 172, 174.

Where the blades being refurbished are cobalt-based, the composition of the metal powder can be that commercially sold by the name Haynes Alloy #25 or #31, having the following make-up:

ESSENTIAL CHEMICAL ANALYSIS OF HAYNES ALLOY #25

Percent by weight:
1. Carbon—0.09
2. Silicon—0.22
3. Manganese—1.55
4. Phosphorus—0.018
5. Sulfur—0.007
6. Chromium—20.32
7. Nickel—10.56
8. Tungsten—14.30
9. Iron—2.25
10. Cobalt—50.685

The method of the present invention is not intended to be limited to the repair of cobalt-based blades. Nickel-based blades could just as readily be repaired, using a nickel-based alloy powder for the plasma spray deposit. As an example, nickel based blades typically have the following composition:

Percent by weight:

|  | min | max |
|---|---|---|
| Carbon | 0.08 | 0.13 |
| Manganese | — | 0.20 |
| Phosphorus | — | 0.015 |
| Sulfur | — | 0.015 |
| Silicon | — | 0.25 |
| Chromium | 7.50 | 8.50 |
| Cobalt | 9.50 | 10.50 |
| Molybdenum | 5.75 | 6.25 |
| Aluminum | 5.75 | 6.25 |
| Tantalum | 4.00 | 4.50 |
| Hafnium | 1.05 | 1.25 |
| Titanium | 0.80 | 1.20 |
| Boron | 0.010 | 0.020 |
| Zirconium | — | 0.13 |
| Iron | — | 0.35 |
| Tungsten | — | 0.10 |
| Columbium | — | 0.10 |
| Bismuth | — | 0.00005 |
| Lead | — | 0.0005 |
| Selenium | — | 0.0003 |
| Tellurium | variable |  |
| Thallium | variable |  |
| Nickel | remainder |  |

In such a case, the powder employed for the plasma spray would be similar in composition to the above. As presently understood, minor deviations in the relative proportions of the materials listed above could occur, with equally good or possibly even improved results.

Figure 22:
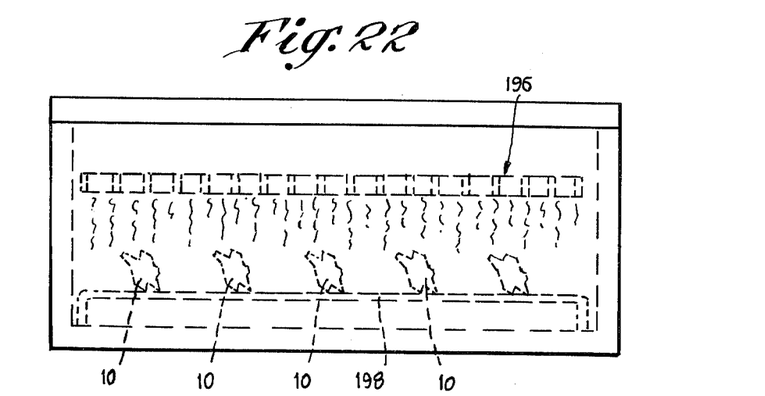
FIG. 22 is a front elevational view of a furnace in which the blades are sintered after having the Z-notches of their shrouds built up by the plasma spray process of FIG. 19.

Following the plasma spray, the blades are sintered at 1975° F., ±25°, for 7¾ hours ±10 min., in order to season the bond to the base metal. A suitable sintering furnace is diagrammatically shown in FIG. 22, comprising a heating element 196, and a rack 198 on which a series of blades 10 can be placed. Following sintering, the blades are cooled at a rate of 35° F./minute, or faster, in an atomosphere of hydrogen or argon.

Figure 21:
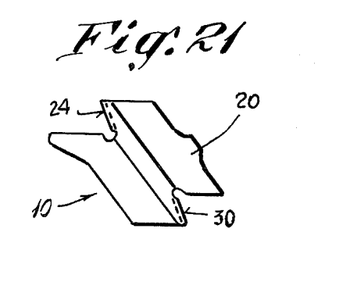
FIG. 21 is a view like FIG. 2, except showing the blade after it has had its Z-notches built up by the plasma spray process of FIG. 19.

FIG. 21 shows a blade after the Z-notches of 24, 30 of its shroud 20 have been built up to the extent shown by the solid lines closely duplicating the dimensions of new blades, with the dotted lines indicating the locations of the ground down edges prior to their being built up by the plasma spray process described above.

In accomplishing the present method, the interval of time during which the plasma spray is directed against the shroud edge is carefully controlled, as is the rate of deposition, such that virtually no additional refinishing operations are required. This is in sharp contrast with prior methods of refurbishment, wherein after material was plasma sprayed on a component, considerable refinishing in the nature of additional grinding and/or polising operations were required. With the present apparatus, it has been found no such refinishing operations are needed. Instead, the blade can be removed from the fixture 156, sintered, polished and inspected, and thereafter put into immediate use.

The restored edge portions have been found to meet the stringent requirements for use as set forth for new turbine components. The overlay has been found to be especially dense and homogeneous, closely resembling the composition of the base metal. The bonded material has been found to be capable of maintaining an adequate hardness up to 1800° F., well above the operating temperatures normally encountered in the turbine engine stages with which such blades are used.

It is seen that the present invention provides refurbished blades which closely resemble the dimensions of new parts, and there is thus insured high reliability and low stress operation over extended periods of use. The method of the invention is thereby seen to provide a distinct advance and improvement in the technology of turbine blade repairs.

Each and every one of the appended claims defines a distinct aspect of the invention separate from the others, and each claim is accordingly to be treated in this manner when the prior art devices are examined in any determination of novelty or validity.

Variations and modifications are possible without departing from the spirit of the invention, and certain portions of the invention can be used without others.

We claim:

1. The method of repairing worn turbine blades which are originally cast to a predetermined geometry, and formed of a metal selected from the group consisting of nickel-based and cobalt-based alloys, comprising the steps of grinding down to an accurately predetermined dimension, with respect to a predetermined but no longer existing original finished geometry of the shroud thereof, one worn, undersized edge of the Z-notch of the shroud, masking the shroud on both sides of said edge after the grinding thereof, subjecting said ground-down edge to a plasma stream comprising essentially a metal selected from the group consisting of nickel-based and cobalt-based alloys, said plasma stream having essentially the same composition as that of the turbine blade being repaired and being applied to an extent which is just sufficient to build up said edge substantially to its original overall finished dimension, such that the added alloy and the metal of the blade become essentially homogeneous and of similar composition, and thereafter sintering said blade at elevated temperatures for a predetermined length of time to season the repair.

2. The method of claim 1, wherein the sintering is carried out at a temperature on the order of 1975° F.

3. The method of claim 1, and including the further steps of cooling the blade after sintering, at a rate essentially not appreciably less than 35° F./minute.

4. The method of claim 1, wherein the step of subjecting the ground-down edge to the plasma stream comprises spraying the metal alloy against said edge with a particle velocity in excess of supersonic speed.

5. The method of claim 1, wherein the step of subjecting the ground-down edge to the plasma stream comprises spraying the metal alloy against said edge with a particle velocity on the order of twice the speed of sound.

6. The method of claim 1, wherein the step of subjecting the ground-down edge to the plasma stream comprises spraying the edge with a molten alloy having substantial quantities of chromium.

7. The method of claim 1, wherein the step of subjecting the ground-down edge to the plasma stream comprises spraying the edge with a molten alloy containing silicon not in excess of several percent.

8. The method of claim 1, wherein the step of masking the shroud comprises placing a housing around those portions of the edge which are to be built-up.

9. The method of claim 1, wherein the step of masking the shroud comprises placing a slotted metal plate in front of the portion of the edge which is to be built-up.

10. The method of claim 1, wherein the metal alloy of the blades contains nickel.

11. The method of claim 10, wherein the metal alloy of the plasma stream contains nickel.

12. The method of claim 1, wherein the metal alloy of the blades contains cobalt.

13. The method of claim 12, wherein the metal alloy of the plasma stream contains cobalt.

14. The method of claim 1, and including the further steps of grinding down to an accurately predetermined dimension one edge of the other Z-notch in the mounting shroud, masking the shroud on both sides of the immediately preceding edge after the grinding thereof, and subjecting it to a plasma stream containing a metal alloy so as to build it up to its original dimension.

* * * * *